Figure 1:
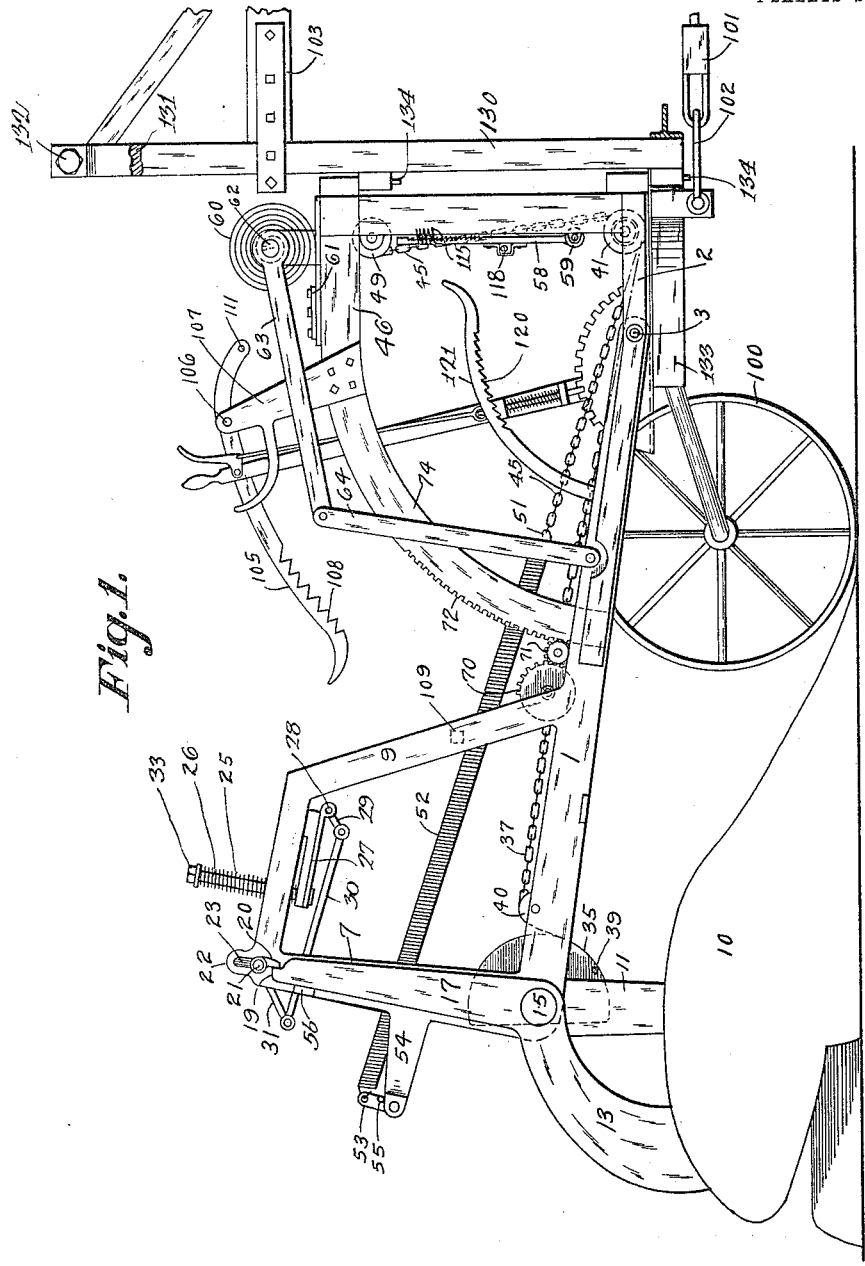

J. TEN HOOPE.
AUTOMATIC TRIP BEAM PLOW.
APPLICATION FILED JUNE 17, 1912.

1,127,441.

Patented Feb. 9, 1915.
4 SHEETS—SHEET 1.

Witnesses
J. A. Otto
I. D. Bremer

Inventor
John ten Hoope
By Erwin E. Wheeler
Attorneys

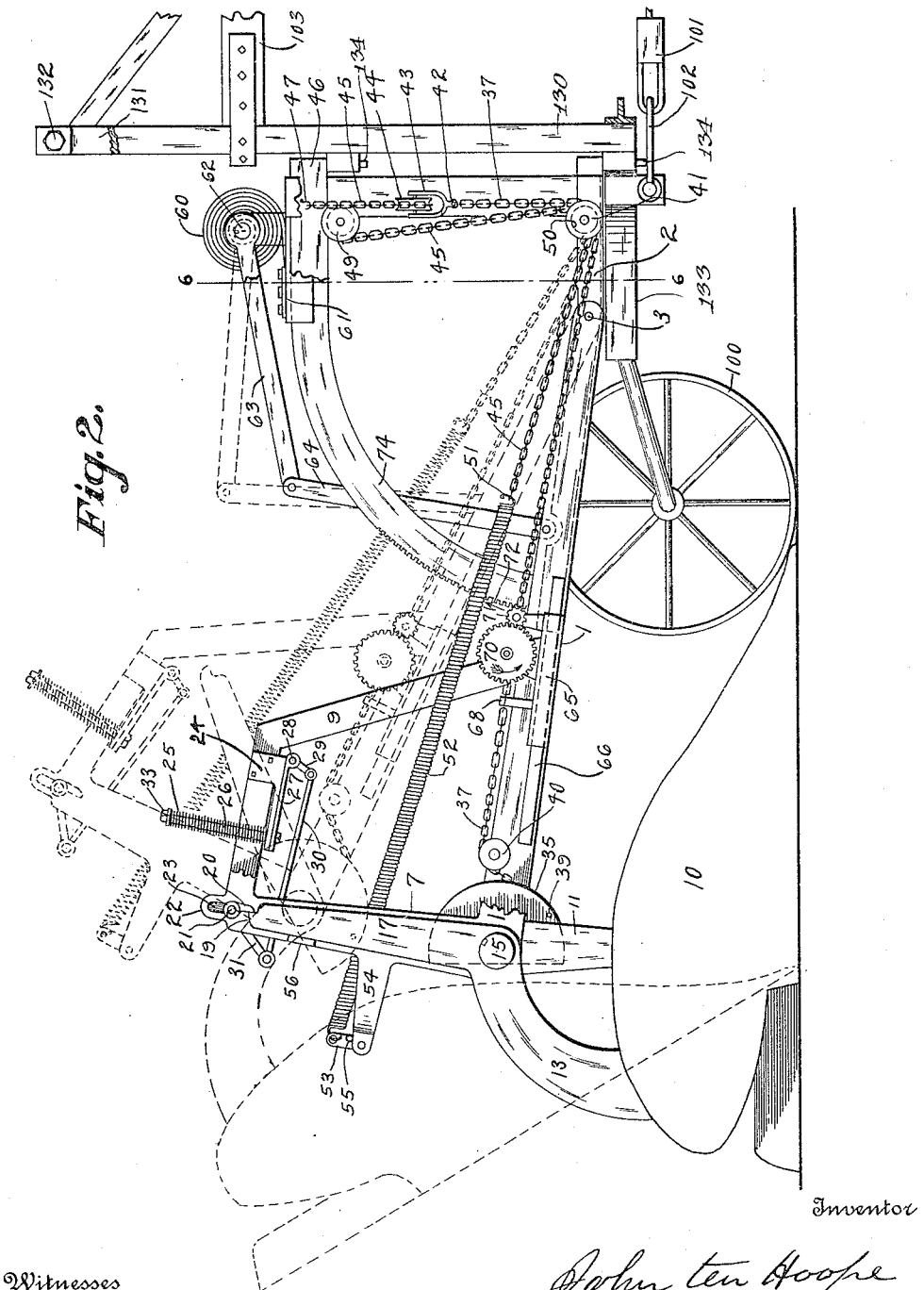

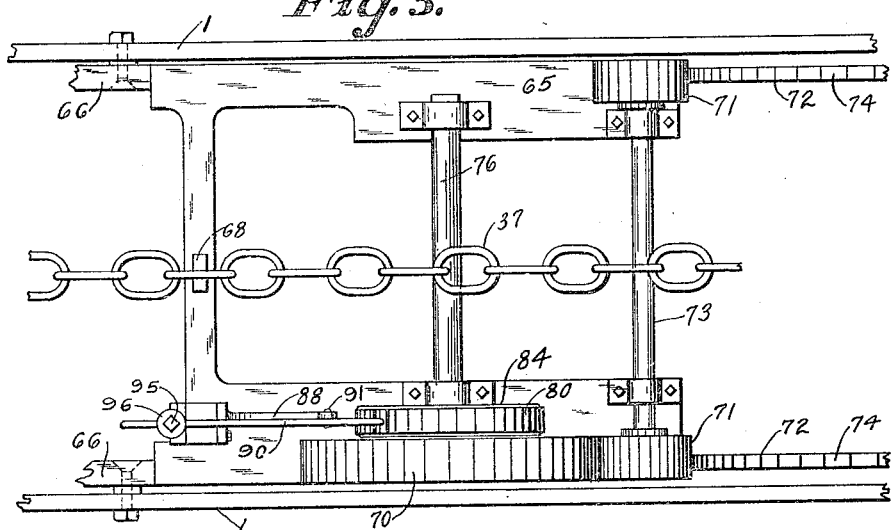
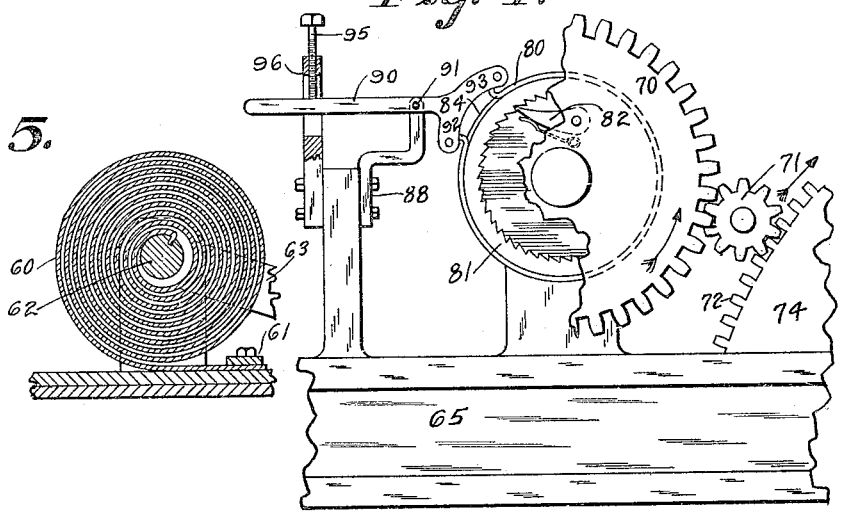

J. TEN HOOPE.
AUTOMATIC TRIP BEAM PLOW.
APPLICATION FILED JUNE 17, 1912.
1,127,441.
Patented Feb. 9, 1915.
4 SHEETS—SHEET 4.
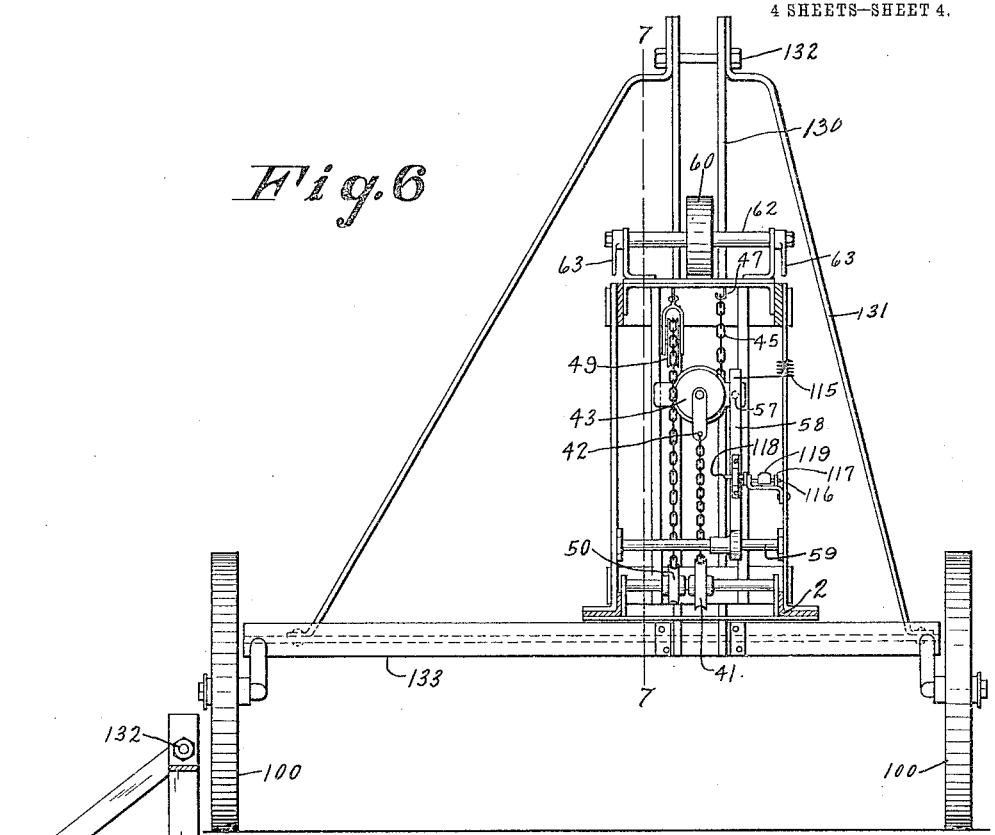
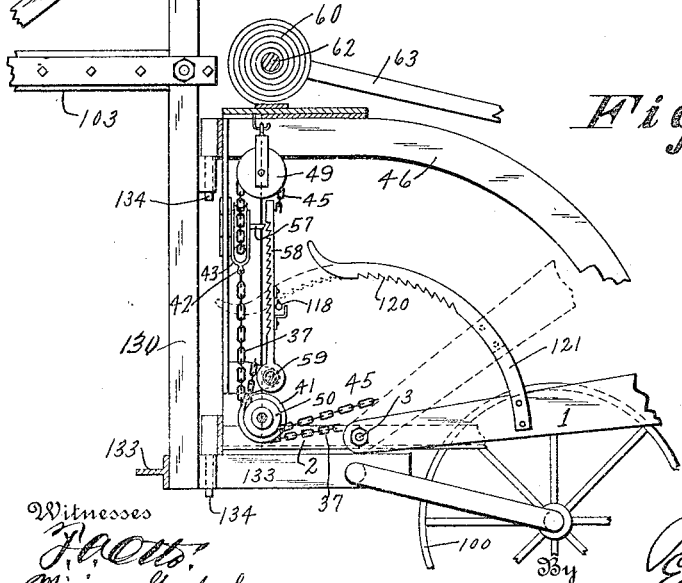
Witnesses
Miriam Gaylord
Inventor
John ten Hoope
By Erwin E. Wheeler
Attorneys

UNITED STATES PATENT OFFICE.

JOHN TEN HOOPE, OF WAUPUN, WISCONSIN.

AUTOMATIC TRIP BEAM PLOW.

1,127,441.  Specification of Letters Patent.  Patented Feb. 9, 1915.

Application filed June 17, 1912.  Serial No. 703,995.

*To all whom it may concern:*

Be it known that I, JOHN TEN HOOPE, a subject of Queen Wilhelmina, residing at Waupun, county of Fond du Lac, and State of Wisconsin, have invented new and useful Improvements in Automatic Trip Beam Plows, of which the following is a specification.

My invention relates to improvements in automatic trip beam plows.

The object of my invention is to provide a practical and efficient form of plow which will automatically lift out of the ground when it encounters an unyielding obstruction, and will readjust itself to plowing position after passing the obstruction.

In the drawings Figure 1 is a side elevation of a plow embodying my invention with the plow in position of use and with portions of the tongue frame partially broken away. Fig. 2 is a side view with dotted lines showing the plow in lifted position as it appears when passing over an obstruction, portions of the frame being illustrated in longitudinal section. Fig. 3 is a detail plan view of the tension mechanism. Fig. 4 is a detail fragmentary side view of the same. Fig. 5 is a detail side view, enlarged, of the resetting spring. Fig. 6 is a detail sectional view, drawn on line 6—6 of Fig. 2. Fig. 7 is a detail sectional view, drawn on line 7—7 of Fig. 6.

Like parts are identified by the same reference characters throughout the several views.

The plow beams 1 are connected with the main frame 2 by a pivot bolt or shaft 3. At their rear ends, the beams 1 are provided with posts 7, which may be either formed integrally therewith or rigidly connected thereto, the upper ends of which are supported from the beams 1 by braces 9. The plow 10 is supported from the rear ends of the beams 1 by arms 11 and 13, each of which is rigidly secured to a cross shaft 15, journaled in the rear end portions of the beams 1 at the bases of the posts 7. Locking arms 17, (one on each side), are rigidly connected with the shaft 15 and one of them preferably constitutes an extension of the arm 13. These arms 17 are each provided with a notched extremity 19, which is normally engaged by a trip catch 20, as shown in Fig. 1, whereby each of the arms 17 is held in a position parallel with a post 7, one on each side. The trip catches 20 are supported by a cross bolt 21 from a slotted head piece 22, which connects the posts 7 with the braces 9, the bolt extending through the slots 23 in said head piece. The trip catches 20 are held normally in locking position by springs 25 coiled around posts 26 and supported from the head piece 22 by brackets 24. The posts 26 are connected with the trip bolt 21 through arm 27, pivot shaft 28, arm 29, link 30, and arm 31, the latter being rigidly connected with the bolt 21. With this construction, when the trip catches 20 swing out of normal position under the pressure of the arms 17, the posts 26 are drawn downwardly, compressing springs 25, between nuts 33 and brackets 24, said posts having heads or nuts 33 at their upper ends which bear upon the springs. The reaction of the springs 25 restores the trip catches to normal position as soon as the pressure of the arms 17 is released.

A pulley segment 35 is mounted upon and rigidly secured to shaft 15 between the posts 7. A chain 37 is secured to this segment 35 at 39 and extends between the beams 1 over guide pulleys 40 and 41 and connects at 42 with a pulley block 43. This pulley block carries a pulley 44 and is supported by a chain 45, one end of which is secured to main frame member 46 at 47. The chain 45 passes around pulley 44 and upwardly over pulley 49, downwardly around pulley 50 and connects at 51 with a coiled spring 52. At its rear end, this spring is connected by a link 53 with arms 54, which project rearwardly from the posts 7. The link 53 is provided with a cross pin 55, which serves as a stop to hold the link normally in vertical position. With this construction, it will be observed that the spring 52, operating through chain 45, traveling pulley 44, chain 37 and segment 35, tends to hold arm 17 in the position in which it is shown in Fig. 1 with the plow 10 in normal position. Said spring 52 is adapted to yield, however, under pressure applied to the plow point, thus permitting chain 37 to wind upon segment 35 and allowing the plow to swing to its dotted line position illustrated in Fig. 2, whenever the arm 17 is released from catch 20.

By allowing the beams 1 to lift upon the pivot shaft 3 and by allowing the plow to tilt upon the pivot shaft 15 at the rear ends of the beams, the construction as above described, permits the plow to pass over an immovable obstacle by first allowing the plow to tilt upon its own point as a fulcrum until it reaches a position where it will lift bodily and drag over the obstruction, the lifting movement of the beams 1 permitting the bodily elevation of the plow. Upon passing the obstruction, it is desirable that the plow be automatically reset in the ground, and this is accomplished by the spring 52 in coöperation with the parts which will now be described and which more particularly control the resetting operations.

When the beams 1 are lifted to the dotted line position, the arms 17 being also swung forwardly as indicated by said dotted lines, the pulley block 43 is locked in the depressed position to which it has been drawn by chain 37 in winding upon segment 35. Said pulley block 43 is thus locked in its depressed position by a latch 57, which is adapted to engage teeth upon a bar 58 pivotally supported from the main frame at 59 and normally projecting upwardly with its teeth in a position for engagement with the latch 57. This latch 57 therefore prevents spring 52 and chain 45 from pulling upon chain 37 to restore the plow to a horizontal position until latch 57' is released.

Swinging arm 58 is normally held in latch engaging position by a spring 115. It may be swung from such position, however, by a crank shaft 116 pivoted to the main frame 117, and having a crank pin 118 loosely engaged in a suitable bearing on the arm 58. The crank shaft 116 is provided with a member 119, which is adapted to be engaged, (when the beams 1 are lifted), by teeth 120 on segment 121. During the upward movement of the beams 1, this segment passes freely over the member 119, the teeth 120 being inclined rearwardly so as to operatively engage the member 119 during the return or downward movement of said beams. It follows that during the downward movement of the beams 1, the teeth 120 will engage member 119, and oscillate crank shaft 116, to move arm 58 rearwardly against the tension of spring 115, thereby releasing latch 57. The teeth 120 are so positioned upon the segment 121 that this release of latch 57 will take place after the initial downward movement of the beams 1. But after the downward movement of the beams 1 commences, it is so rapid that reentry of the plow point in the ground is virtually instantaneous. The slight delay in retracting latch bar 58 is therefore sufficient to prevent spring 52 from resetting the plow in normal position until after the plow point has reëntered the ground.

When the plow swings to normal position from the dotted line position of Fig. 2, the extremities 19 of the arms 17 will strike upon the rounded front portions of the catches 20 and as the rear upper faces of the extremities 19 are beveled, catches 20 will be lifted bodily to allow the extremities 19 to pass underneath them to locking position. The slots 23 allow shaft 21 to move upwardly with the catches, when the latter are lifted by the extremities 19 during the return movement of arms 17. The backward movement of the arms is limited by stops 56. When the arms 17 are drawn backwardly against the stops by the reaction of spring 52, shaft 21 and catches 20 will again drop to locking position. These catches may therefore be termed gravity action locks. They operate as trips only under forward pressure exerted by the arms 17.

When the plow 10 swings to the dotted line position, it lifts out of the ground in order to pass over the obstruction, this lifting movement being caused by the obstruction against which the plow point bears. The lifting movement is aided by a coiled spring 60, one end of which is secured to the frame member 46 at 61, the other end of which is secured to a shaft 62 to which arms 63 (one on each side), are rigidly connected. The arms 65 are connected by links 64 with the beams 1, whereby, when the plow is tilted as above explained, the tension of the spring 60 will tend to lift the beams 1 and the plow, and thus assist the latter in passing over the obstruction. The weight of the plow and its downwardly drawing tendency will cause it to descend and pull the beams 1 downwardly against the tension of spring 60 as soon as the plow point clears the obstruction.

To prevent beams 1 from lifting under ordinary conditions, I employ a traveler 65, which is mounted to slide in a channel 66 formed in the inner faces of the beam 1 and is connected by an arm 68 with the chain 37. This traveler carries a gear wheel 70 and a set of pinions 71 connected with each other by a shaft 73. The pinions are adapted to mesh with teeth 72 on a segmental rack bar 74, rigidly connected with the main frame member 46. When the pinions are in mesh with the teeth 72 of the rack bar, said teeth 72 will cause the pinions 71 to rotate during an upward movement of the beams 1 and this rotation of the pinions will be transmitted to actuate the gear wheel in the direction indicated by the arrow in Figs. 2 and 4, one of the pinions 71 being in mesh with the gear wheel 70, as best shown in Figs. 3 and 4.

The rotation of gear wheel 70 in the direction indicated by the arrow, is resisted by the brake band 80, which encircles an internally toothed ratchet wheel 81, with the teeth of which a spring actuated pawl 82 carried by gear wheel 70, is adapted to engage. The wheel 81 encircles a shaft 76 upon which gear wheel 70 is mounted, but said wheel 81 is supported by the brake band 80 and by side disks 84, which are rotatably mounted upon said shaft 76. The brake band is supported from the traveler 65 by a bracket member 88 and lever 90, said lever 90 being pivoted to the bracket member at 91 and having arms 92 and 93 respectively to which the ends of the brake band 80 are connected. A screw 95, having threaded engagement with an arm 96 of bracket member 88, is arranged to bear upon the lever 90 and by adjusting this screw 95, the tension of the brake band upon the ratchet member 81 may be regulated. Under normal conditions therefore, a lifting movement of the beams 1 will be opposed, by the brake band 80, which tends to prevent gear wheel 70 from rotating as it must do when pinions 71 move upwardly in engagement with the teeth 72 of the rack bars 74. The brake band 80, however, offers no resistance to a downward movement of the beams 1, since the gear wheel 70 is free to rotate in the opposite direction from that indicated by the arrow in Fig. 4, the pawl 82 sliding freely over the teeth of ratchet member 81 during such downward movement of the beams.

When the plow strikes an obstruction, the tendency is for the beams 1 to lift. This is resisted by the upward movement of the pinions 71 along the segments 74 and by the brake bands 80, which tend to prevent gear wheel 70 and pinions 71 from rotating. If the obstruction yields, the beams 1 return to normal position under the downward pull of the earth upon the plow notwithstanding the upward pull exerted by springs 60. But if the obstruction does not yield, the resistance quickly becomes sufficient to cause the arms 17 to swing forwardly, trip catches 20 being oscillated under the excessive pressure exerted by the extremities 19 of said arms. As soon as trip catches 20 release arms 17, they swing forwardly, whereupon segment 35 oscillates upon shaft 15 and tends to wind up chain 37 thereon. Chain 37 in this movement pulls the traveler 65 rearwardly, thus withdrawing pinions 71 from engagement with the teeth 72 of the segment 74. Beams 1 are now free to swing upwardly to the position indicated by dotted lines in Fig. 2 without other resistance than the weight of the parts partly relieved by the pull exerted by spring 60. The resistance due to the obstruction encountered by the plow point will thus cause the plow to tilt and simultaneously lift to the dotted line position of Fig. 2, whereupon it will be dragged over the obstruction. As soon as the plow point can again enter the ground, the weight of the parts drives the plow point downwardly into the ground and the resistance of the ground upon the upper surface of the point and the share, together with the pull exerted by the spring 52, then assists in drawing the plow downwardly and into its normal position.

Draft connections are applied to an evener bar 101 connected with the tongue frame by a clevis 102. The tongue 103 is connected with the tongue frame which includes uprights 130, the lower ends of which are secured to a bowed angle iron bar 133, supported by wheels 100. The main frame 2 is supported from the upright 130 by hinge connections at 134. Lateral braces 131 support the uprights 130 from the bar 133.

In conveying the plow from one place of use to another, it is necessary to hold the beams 1 in a raised position. A toothed arm 105 is pivotally connected at 106 with a bracket 107, said bracket being connected with the main frame or with the segment bars 74. The teeth 108 of this bracket are adapted to engage over a cross rod 109 connecting braces 9 when the beams 1 are in a raised position. This prevents a downward movement of the beams 1 until the latch arm 105 is released from cross rod 109. The rear end of the arm 105 is curved so that this arm will be automatically lifted by cross rod 109 when the beams 1 are raised to a sufficient height. The beams may be raised to such height that the cross rod 109 will, after lifting the arm 105, pass under the teeth 108 and be automatically engaged by said teeth. The arm 105 may, however, be moved to a releasing position from any convenient point by pulling upon a cord or wire connected to an eye 111 at the down turned front end of the arm or lever 105.

I claim—

1. An automatic trip beam plow, comprising the combination with a main frame, of a beam pivoted to the main frame, a plow pivotally connected with the beam, trip mechanism normally preventing the plow from tilting upon its pivotal connection with said beam, means for resiliently opposing a tilting movement of the plow when released by the trip mechanism, and independent means for resiliently assisting a lifting movement of the beam, together with brake mechanism arranged to oppose a lifting movement of the beam, and means for releasing the beams from the operation of the brake mechanism when the plow is released by the trip mechanism.

2. An automatic trip beam plow, comprising the combination with a main frame, of a plow having a double pivotal connection with said frame; said plow being adapted to lift upon one of said pivotal connections as a center, and to tilt rotatively about the other, trip mechanism normally opposing the rotative movement and brake mechanism normally opposing the lifting movement of said plow, said trip mechanism being adapted to release under excessive strain; and means for utilizing the tilting movement of the plow to release the brake.

3. An automatic trip beam plow, comprising the combination with a main frame, of a plow having a double pivotal connection with said frame; said plow being adapted to lift upon one of said pivotal connections as a center, and to tilt rotatively about the other, trip mechanism normally opposing the rotative movement and brake mechanism normally opposing the lifting movement, of said plow, said trip mechanism being adapted to release under excessive strain, and means for utilizing the tilting movement of the plow to release the brake, together with resetting means for restoring the plow to normal position after a tilting and lifting movement.

4. An automatic trip beam plow, comprising a support, a beam pivotally connected therewith, a plow pivoted to the beam, a device normally preventing the plow from swinging upon its pivotal connection with the beam, means for normally resisting an upwardly swinging movement of the beam, and automatic plow resetting mechanism.

5. An automatic trip beam plow comprising a support, a plow, a beam pivoted to the support and plow respectively, an upwardly projecting post on the beam, an upwardly projecting arm carried by the plow, a gravity action lock normally holding said arm to the post, and a spring operatively connected with said arm and coöperating with said lock to hold the plow normally in operative position; said spring being also adapted to swing the plow to operative position when released from the lock and tilted.

6. The combination with a support, a pivotally supported plow beam, and a plow provided with an arm pivotally connected with the beam, of means for releasably locking said arm against movement relative to the beam, a pulley segment connected with said arm, a chain secured thereto and adapted to wind thereon, a spring connected with the chain and adapted to resist swinging movements of the plow arm, a brake drum, a support for the drum connected with said chain, a brake operatively connected with the drum and carried by said support, and means for utilizing the upwardly swinging movements of the beam to actuate said drum in opposition to the brake,—said chain being adapted to withdraw the brake drum from its actuating means when the arm is released from the trip mechanism and the chain wound upon said pulley segment.

7. The combination with a support, a pivotally supported plow beam, and a plow provided with an arm pivotally connected with the beam, of means for releasably locking said arm against movement relative to the beam, a pulley segment connected with said arm, a chain secured thereto and adapted to wind thereon, a spring connected with the chain and adapted to resist swinging movements of the plow arm, a brake drum, a support for the drum, connected with said chain, a brake operatively connected with the drum and carried by said support, and means for utilizing the upwardly swinging movements of the beam to actuate said drum in opposition to the brake,—said chain being adapted to withdraw the brake drum from its actuating means when the arm is released from the trip mechanism and the chain wound upon said pulley segment, said beam being adapted to swing freely in a downward direction independently of the brake.

8. The combination with a support and a swinging plow beam pivotally connected therewith, of a traveling member carried by said beam, a brake drum rotatively mounted thereon, a brake resisting the rotation of the drum, a segmental member connected with the support, gear connections for actuating the drum and having rack and pinion connection with the segmental member, a one way clutch for transmitting motion from the gear connections to the drum when the plow beam is lifted, a plow pivotally connected with the beam, and means for utilizing a tilting movement of the plow to retract the traveling member and disengage the gearing from operative engagement with said segmental member.

9. The combination with a support, of a swinging plow beam pivotally connected therewith, a plow having an arm pivotally connected with the outer end of the plow beam, a segmental member carried by said arm, a chain connected with the segmental member, a post mounted upon said plow beam, a spring connected with said post, a spring actuated chain connected with said spring, fixed pulleys on the support over which said chains pass, and a traveling pulley supported by the spring actuated chain and connected with the first mentioned chain.

10. The combination with a support, of a swinging plow beam pivotally connected therewith, a plow having an arm pivotally connected with the outer end of the plow beam, a segmental member carried by said arm, a chain connected with the segmental member, a post mounted upon said plow beam, a spring connected with said post, a spring actuated chain connected with said spring, fixed pulleys on the support over which said chains pass, and a traveling pulley supported by the spring actuated chain and connected with the first mentioned chain, together with a latch for locking the traveling pulley in depressed position, and means connected with the plow beam for disengaging said latch during a downward movement of said beam.

11. The combination with a support, of a swinging plow beam pivotally connected therewith, a plow having an arm pivotally connected with the outer end of the plow beam, a segmental member carried by said arm, a chain connected with the segmental member, a post mounted upon said plow beam, a spring connected with said post, a spring actuated chain connected with said spring, fixed pulleys on the support over which said chains pass, and a traveling pulley supported by the spring actuated chain and connected with the first mentioned chain, together with means for resisting upwardly swinging movements of the plow beam and means connected with the first mentioned chain for releasing the plow beam from said resisting means, when the plow is tilted.

12. The combination with a support, of a swinging plow beam pivotally connected therewith, a plow having an arm pivotally connected with the outer end of the plow beam, a segmental member carried by said arm, a chain connected with the segmental member, a post mounted upon said plow beam, a spring connected with said post, a spring actuated chain connected with said spring, fixed pulleys on the support over which said chains pass, and a traveling pulley supported by the spring actuated chain and connected with the first mentioned chain, together with a one way acting brake mechanism resisting upwardly swinging movements of the plow beam, latch mechanism resisting tilting movements of the plow upon its pivotal connection with said beam, means for releasing said latch mechanism under predetermined pressure applied to the plow, and means connected with the first mentioned chain for relieving the beam of brake pressure when the plow is tilted upon its connection with the beam.

13. The combination with a support, of a plow beam pivotally connected therewith, a plow having an arm pivotally connected with and extending above the plow beam, an upwardly extending post on the plow beam, a latch carried by the post and adapted to releasably engage said arm above the beam, a spring for holding said latch in operative position, a spring arranged to draw said arm into latch engaging position, and hold the plow in plowing position, said arm being also adapted to hold the plow in plowing position independently of the spring when engaged by said latch, and said latch being adapted to release the arm under predetermined pressure applied to the plow point.

14. The combination with a support, a plow beam pivotally connected therewith, a plow having an arm pivotally connected with the plow beam, a post on the plow beam, a latch carried by the post and adapted to releasably engage said arm, a spring for holding said latch in operative position, a spring arranged to draw said arm into latch engaging position, and for holding the plow in plowing position, said arm being also adapted to hold the plow in plowing position upon said beam when engaged by said latch, and said latch being adapted to release the arm under predetermined pressure applied to the plow point, together with means for resisting an upward movement of the plow beam and means connected with said arm for retracting the resisting means when the arm is released from said latch.

15. The combination with a support, of a plow provided with an upwardly projecting arm, a plow beam having its ends respectively pivoted to the support and to said arm, a spring connected with the plow supporting end of the plow beam, a pulley carried in a raised position by said support, a chain connected with the spring and extending over said pulley with its other end connected with said support, a traveling pulley hung upon said chain between the first mentioned pulley and the point of chain connection with said support, another chain connected with said traveling pulley, and means for actuating the same from the plow during swinging movements of the latter.

16. The combination with a support, of a plow provided with an upwardly projecting arm, a plow beam having its ends respectively pivoted to the support and to said arm, a spring connected with the plow supporting end of the plow beam, a pulley carried in a raised position by said support, a chain connected with the spring and extending over said pulley with its other end connected with said support, a traveling pulley hung upon said chain between the first mentioned pulley and the point of chain connection with said support, another chain connected with said traveling pulley, and means for actuating the same from the plow during swinging movements of the latter, together with a trip latch arranged to oppose swinging movements of said arm, said means for opposing upwardly swinging movements of the beam, said trip latch being adapted to yield under predetermined pressure applied thereto through said plow arm, said spring and its chain connection being adapted to reset the plow arm in engagement with said latch, and said latch being adapted to yield to allow the arm to pass during the resetting movement.

17. The combination with a support, of a plow provided with an upwardly projecting arm, a beam linking the plow arm with said support, a trip latch normally holding the plow arm with the plow in operative position, a spring connected with the beam, flexible connections secured to said spring, pulleys connected with the support over which said flexible connections pass, and means for utilizing a swinging movement of the plow to draw upon said flexible connections, whereby said spring may be utilized for resetting the plow when swung out of operative position on its pivotal connection with said beam.

18. The combination with a support, of a plow provided with an upwardly projecting arm, a beam linking the plow arm with said support, a trip latch normally holding the plow arm with the plow in operative position, a spring connected with the beam, flexible connections secured to said spring, pulleys connected with the support over which said flexible connections pass, and means for utilizing a swinging movement of the plow to draw upon said flexible connections, whereby said spring may be utilized for resetting the plow when swung out of operative position on its pivotal connection with said beam, together with means for resisting upward movements of said beam, and means connected with said flexible connections for releasing the beam from the resisting means when the plow is tilted from operative position.

19. The combination with a support, of a plow provided with an upwardly projecting arm, a beam linking the plow arm with said support, a trip latch normally holding the plow arm with the plow in operative position, a spring connected with the beam, flexible connections secured to said spring, pulleys connected with the support over which said flexible connections pass, and means for utilizing a swinging movement of the plow to draw upon said flexible connections, whereby said spring may be utilized for resetting the plow when swung out of operative position on its pivotal connection with said beam, together with means for resisting upward movements of said beam, means connected with said flexible connections for releasing the beam from the resisting means when the plow is tilted from operative position, means for partially supporting said beam in raised position, and means for delaying the operation of the plow resetting spring until after the initial downward movement of the beam.

20. The combination with a support, of a plow beam pivoted thereto, a plow pivotally connected with the beam, a trip for holding the plow in a normal position, a brake for holding the beam in normal position, a plow resetting spring, a beam lifting spring, and means for delaying the action of the plow resetting spring until after the initial resetting movement of the beam.

21. The combination with a support, of a plow beam pivoted thereo, a plow pivotally connected with the beam, a trip for holding the plow in normal position, a brake for holding the beam in normal position, a plow resetting spring, a beam lifting spring, and means for delaying the action of the plow resetting spring until after the initial resetting movement of the beam, together with means for rendering the brake mechanism inoperative except when the plow is in normal position.

22. The combination with a plow beam, of gravity lock and spring controlled trip mechanism connected therewith and adapted to yield under predetermined pressure, a plow having an arm pivoted to said beam and normally engaging said trip mechanism, and a lifting spring connected with said beam and adapted to facilitate lifting and dragging the plow over an obstruction, when the latter is released from the trip mechanism and tilted upon said beam.

In testimony whereof I affix my signature in the presence of two witnesses.

JOHN TEN HOOPE.

Witnesses:
R. D. TILLOTSON,
E. A. TILLOTSON.

Copies of this patent may be obtained for five cents each, by addressing the "Commissioner of Patents, Washington, D. C."